Feb. 7, 1950     C. W. MERRIAM, JR., ET AL     2,496,302
SHIP LOADING EVALUATING DEVICE

Filed Nov. 28, 1945     3 Sheets-Sheet 1

INVENTOR
CHARLES W. MERRIAM, JR.
FRANK K. PERKINS

BY *M. O. Hayes*

ATTORNEY

Feb. 7, 1950     C. W. MERRIAM, JR., ET AL     2,496,302
SHIP LOADING EVALUATING DEVICE
Filed Nov. 28, 1945     3 Sheets-Sheet 2

INVENTOR
CHARLES W. MERRIAM, JR.
FRANK K. PERKINS
BY M. O. Hayes
ATTORNEY

Feb. 7, 1950    C. W. MERRIAM, JR., ET AL    2,496,302
SHIP LOADING EVALUATING DEVICE
Filed Nov. 28, 1945    3 Sheets-Sheet 3
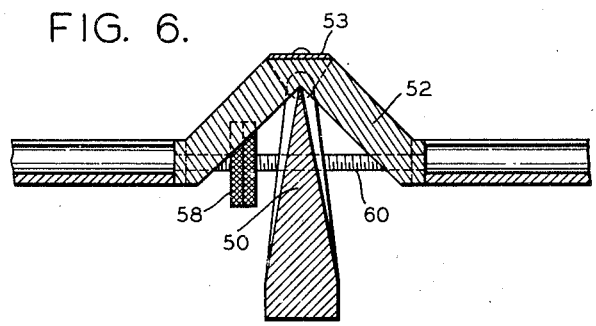
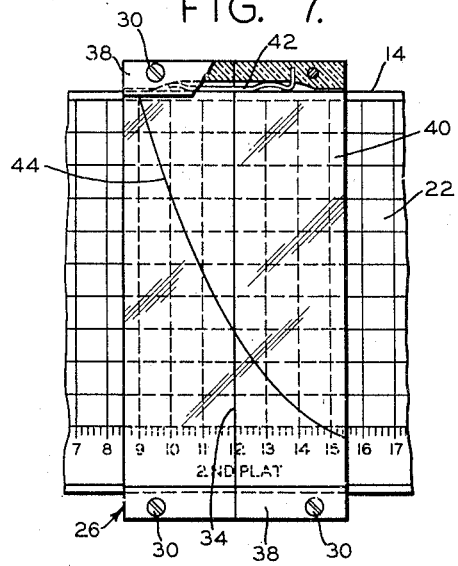
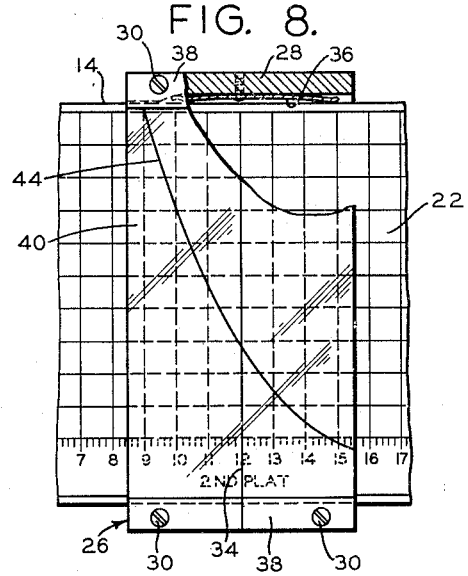
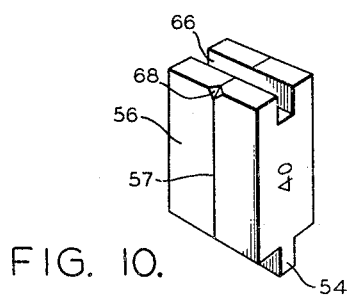
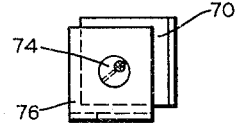
INVENTOR
CHARLES W. MERRIAM, JR.
FRANK K. PERKINS
BY
ATTORNEY Patented Feb. 7, 1950

2,496,302

UNITED STATES PATENT OFFICE 2,496,302

SHIPLOADING EVALUATING DEVICE

Charles W. Merriam, Jr., Taunton, and Frank K. Perkins, Newton, Mass.

Application November 28, 1945, Serial No. 631,466

5 Claims. (Cl. 235—61)

(Granted under the act of March 3, 1883, as amended April 30, 1928; 370 O. G. 757)

This invention relates to an evaluating device and more particularly, to a device for evaluating the effect upon a ship of proposed changes in the aggregate loads and/or distribution thereof, with respect to the stability of that ship.

The stability of a ship is measured in terms of transverse GM, i. e., the distance between a ship's transverse center of gravity (G) and the metacenter (M) of that ship, the latter being the theoretical point above the keel about which the ship as then loaded appears to rotate when in a relatively small angle of a transverse roll.

As cargo or other loads are added to or removed from various locations in the ship, the stability factor, or GM, is correspondingly increased or decreased depending upon the weight of the load or loads added or removed, as well as the centers of gravity of such load or loads.

In the interests of efficient shipping operations, it is desirable to ascertain in advance, before actual load transfer is made either to or from the ship, how such transfer will affect the ship's stability factor, or GM. With certain factors concerning a ship being known, it is possible, by involved mathematical computation to ascertain in advance what effect the addition or removal of load or loads will have upon that particular ship's GM. However, generally, the "know how" for performing these computations has been limited to highly trained and experienced marine architects or naval engineers.

Accordingly, it is an object of the present invention to provide a device whereby the change that will be occasioned in a particular ship's GM by the adding or removing of loads to or from various places in that ship may be readily and accurately evaluated in advance of the actual load transfer, in a simple, accurate, and efficient manner and with a minimum of mathematical computation.

It is a further object of the invention to provide a device of this character which is composed of but few, simple and inexpensive parts, arranged to be easily assembled and cooperating in an efficient manner to visually aid in the ascertainment of change in GM incident to proposed increase or decrease in the ship's load and with respect to the particular place in the ship wherein the change (either addition or removal of load) is proposed to be made.

With the above and other objects and features in view, the invention will now be described with reference to the accompanying drawings which illustrate a preferred embodiment of the invention and will be pointed out in the claims.

In the drawings, Fig. 1 is the top plan view of the ship loading evaluating device;

Fig. 6 is a sectional view taken on the line VI—VI of Fig. 4;

Figs. 7 and 8 are partial plan views partly in section of slide members that cooperate with the graph;

Fig. 9 is a sectional plan view taken on the line IX—IX of Fig. 5; and

Fig. 10 is a detailed perspective view of one of the weights that is used in conjunction with the balance beam.

Figure 1:
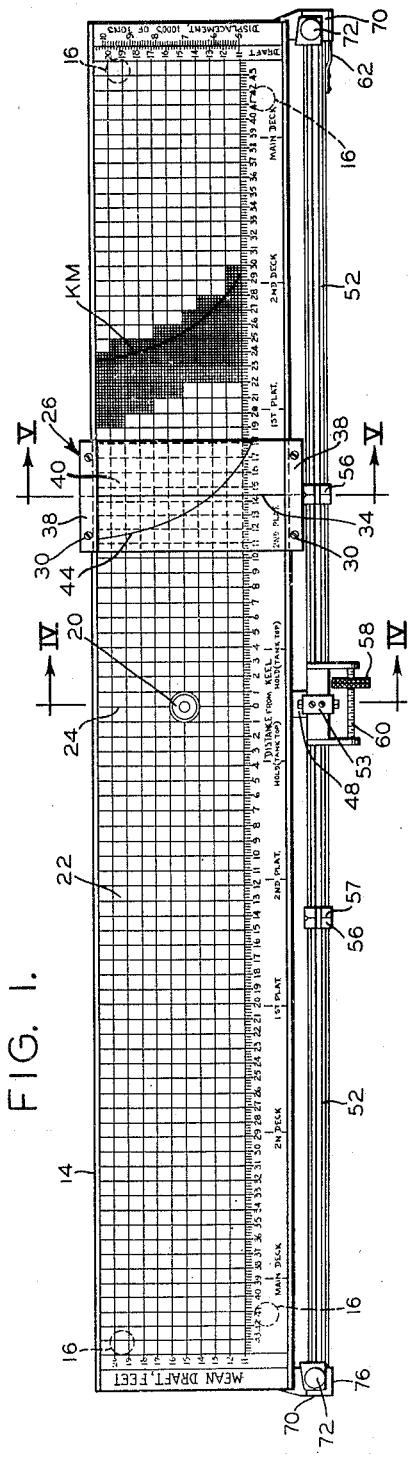

The device comprises an elongated table having a top 14 supported on four legs 16. Each leg 16 has threaded in its lower end a knurled levelling screw 18. Centrally of the top 14 is a universal bubble level 20 having its upper surface lying flush with the upper surface of the top 14. By means of the level 20 and the screws 18, the surface of the table may be adjusted to a true horizontal. Removably attached to the top 14 is a graph 22 having an opening centrally thereof, through which the bubble level 20 may be inspected. The graph 22 is comprised of a series of vertically disposed lines spaced an equal distance from each other from a center line 24 thereof. At the bottom of the center line 24 there is indicated a zero, which represents the keel of a particular vessel for which the graph 22 is plotted. The vertical lines on the opposite sides of the zero line 24 are numbered successively from "1" to "43," these designations representing the distance in feet of different elevations from the keel line. Some of the more pertinent elevations are designated beneath the footage numbers by the terms "2nd platform," "1st platform," "2nd deck," and "main deck." Across the vertical lines there are ruled a series of longitudinally extending lines spaced equi-distant from one another, and at their opposite ends these lines are designated with footage distance which represent the "mean draft" in feet. To the right of the draft in feet is a scale on the right hand side of the graph which is calibrated to read corresponding "Displacement in thousands of tons."

In certain uses of the device it may be more desirable to give emphasis to the "displacement in tons" factors by having the same indicated at the opposite ends of the longitudinally extending lines and having the latter representative of "displacement" rather than of "mean draft."

Intermediate the right hand end of the graph and the center line 24, is a graph curve which is known as "KM" and which is so designated in the drawings. In the vicinity of the graph adjacent to the KM curve are a series of vertical lines representative of .02 of a foot, these lines being ruled between the more widely spaced footage lines. It will be understood that the graph above described is plotted in accordance with certain known factors pertinent to a particular vessel and that for different vessels different graphs may be plotted for use in conjunction with the device.

A slide generally indicated at 26 is marked for sliding movement along the table. This slide comprises side members 28 across the tops of which are secured, as by screws 30, a transparent strip 32. The strip 32 has a hairline 34 inscribed vertically through its center. A friction leaf spring 36 secured to an inner channel of one of the side members 28 bears against one of the edges of the table 14, and thereby serves to hold the slide in any position to which it may be adjusted along the table.

Figure 4:
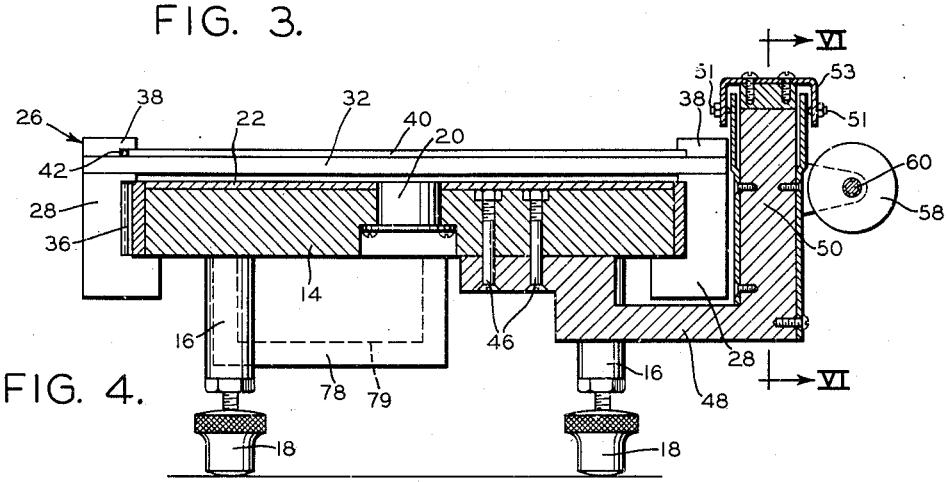
Fig. 4 is a sectional elevation taken on the line IV—IV of Fig. 1.

Recessed cleats 38 (Fig. 4) also secured by the screws 30 are mounted above the transparent strip 32. In the recesses of these cleats there is slidably mounted an auxiliary slide 40 also of transparent material. A wire friction spring 42 secured in one of the recesses frictionally bears against one of the ends of the auxiliary slide 40 so that as the latter is shifted relatively to the strip 32, it will be frictionally retained in any moved position. The auxiliary slide 40 has a curve 44 inscribed thereon, which curve is identical with the KM curve of the graph 22.

Centrally, and to the underside of table 14, there is secured, as by screws 46, a forwardly extending bracket 48 having an upstanding knife edge 50 (see also Fig. 6) upon which is delicately poised a balance beam 52. The beam 52 is held in proper transverse position with respect to the knife edge 50 by conical tipped adjusting screws 51 threaded in a cap 53. The opposite sides of the balance beam 52 are preferably made of channelled stock with the slot of the channel facing upwardly to receive depending tongues 54 of weights 56. A knurled nut 58 is threadably adjustable along a threaded section 60 spanning the fulcrum mounting of the balance beam 52. On the right end of the beam 52 (Fig. 2) is an indicator 62 cooperating with a calibrated zeroing scale 64 secured on the right hand end of the table 14. By means of the nut 58 and indicator 62, the balance beam 52 may be brought into true parallelism with the surface of the graph 22.

The weights 56 above referred to, are representative of various tons of different displacement values. Referring to Fig. 10, it will be seen that these weights at their upper ends have grooves or channels 66 of an exact size and shape to receive the depending tongue 54 of another one of the weights so that after a weight has been inserted within the channel of the balance beam 52, another weight may be added thereto. Each of the weights 56 have inscribed through their vertical center, a scored line 57, which line continues across their tops, and at one of the corners of each top there is provided a sighting notch or declivity 68, the purpose of which will hereinafter appear.

Figure 2:
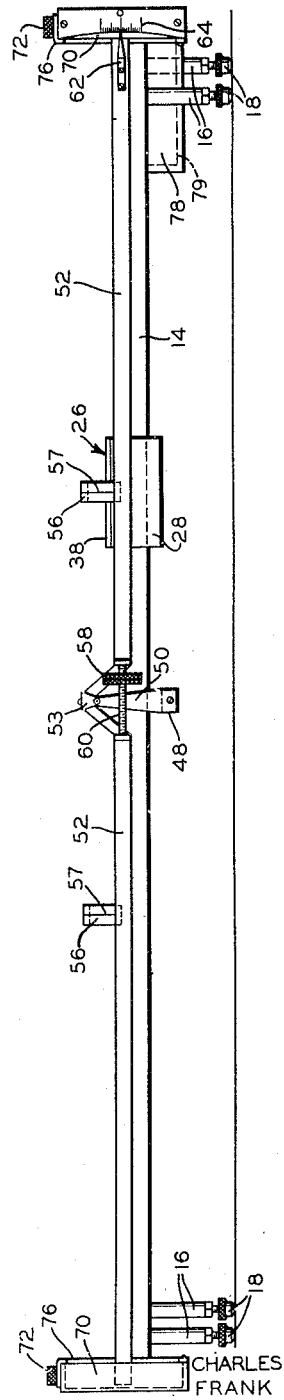
Fig. 2 is a front elevation thereof.
Figure 3:
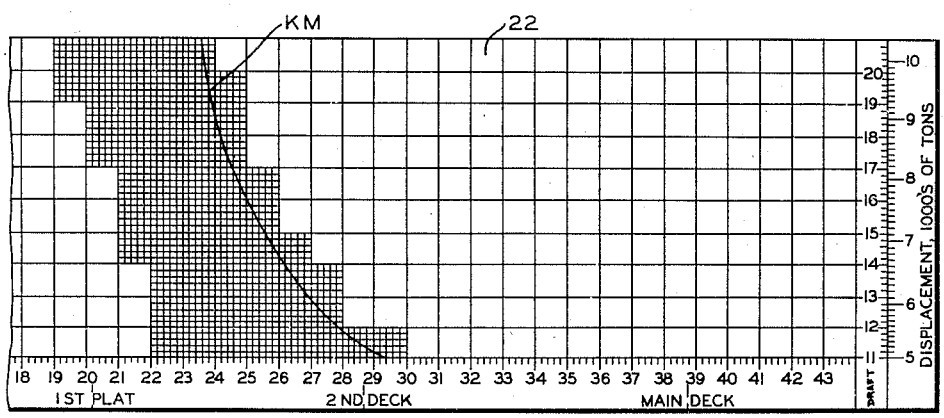
Fig. 3 is an enlarged detailed plan view of a portion of the graph of the device.
Figure 5:
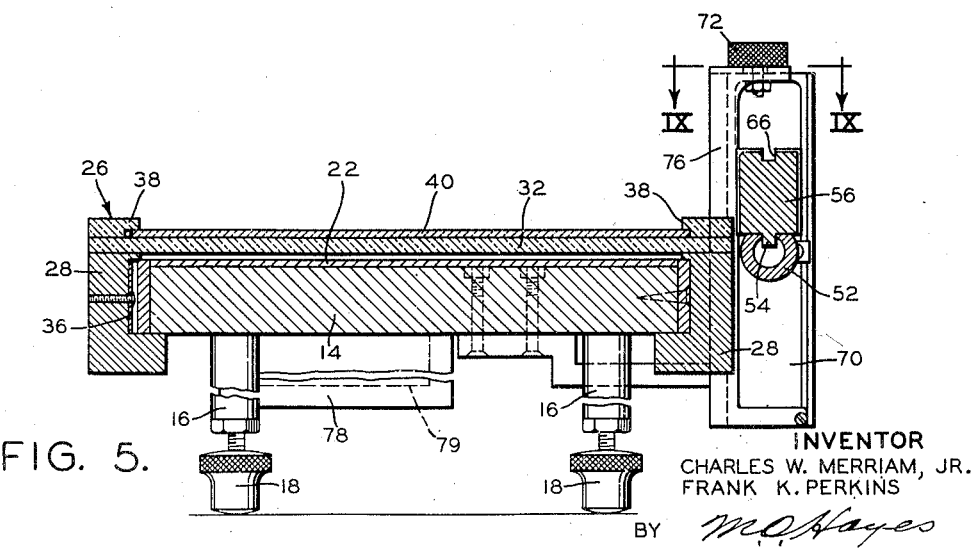
Fig. 5 is a sectional elevation taken on the line V—V of Fig. 1.

Referring now to Figs. 2 and 5, it will be seen that the opposite ends of the balance beam 52 are suitably guided in brackets 70 secured on the opposite ends of the table 14. Each bracket 70 comprises a two part construction and has at its upper end a knurled knob 72 that has a depending, eccentrically disposed projection 74 (Fig. 9) entering within the hingedly connected part 76 of the bracket 70. By simply rotating the knobs 72, the balance beam 52 may be locked against any movement. When however, the device is in operation, the knobs 72 are rotated into such position that the hinged members 76 of the brackets 70 are out of engagement with the balance beam 52 and it is thus rendered free for balancing movement on its knife edge 50. Adjacent the right end of the table 14 and between the legs 16, there may be provided a compartment 78 having a sliding drawer indicated at 79 for containing all of the various sized weights 56 when the latter are not being used.

Having thus described the structure of the device, the cooperation and function of the various parts thereof will be clearly understood from the description of two separate typical operations of the device that are now to be described.

In the first typical example of the use of the device, it will be assumed that the four adjustable leveling screws 18 have been so manipulated that the level 20 indicates that the surface of the graph 22 is truely horizontal and that the knurled nut 58 has been so positioned that the indicator 62 rests at the zero on the scale 64, thus effecting parallelism between the balance beam 52 and the surface of the graph 22.

In this case it will be assumed that the draft amidships is known to be 12.8 feet, that the existing GM is known to be 2.2 feet and that it is desired to ascertain what the new GM would be if 1500 tons of cargo were to be stowed at the mean elevation of 13 feet above the "main deck" level. Now referring to Fig. 1, the following steps are performed:

(a) The KM curve is observed to intersect the 12.8 feet draft line at a point on the longitudinal scale corresponding to 27.15 feet above the keel, thus establishing the ship's metacentric point as being at a height of 27.15 feet above the keel.

(b) Subtracting the known GM of 2.2 feet from the established metacentric height of 27.15 feet, the transverse center of gravity of the ship as then loaded is determined to be 24.95 feet above the keel.

(c) From the draft-displacement scale it is determined that a 12.8 feet draft is equivalent to a displacement of 6000 tons. Accordingly, the hairline 34 of the slide 26 is moved along the right hand side of the graph 22 to 24.95 feet. Then the hairline 57 of a weight 56 representative of the displacement tonnage, is placed on the beam in alignment with the hairline 34 of the slide 26, the notch 68 serving to facilitate this aligning operation. Then in cooperation with the hairline of the slide 26, a duplicate weight is placed on the beam 52 to the left of and an equal distance from the center line 24. The result is that equal weights have been placed at equal distances respectively from the beam's fulcrum 50, the beam 52 then lies parallel to the graph 22, as indicated by the position of the indicator 62 on the scale 64.

(d) Next, the slide 26 is moved to the left of the center line 24 until the hairline 34 overlies the point marking the "Hold," the centerline 24 indicating on the graph 22, the same to be 3.7 feet above the keel. Due to the mean elevation of the new cargo being 13 feet above that of the Hold's deck, the hairline 34 of the slide 26 is then moved over 3.7 plus 13 to 16.7 feet, i. e., the height of the center of gravity of the new cargo above the keel. With the cooperation of the hairline 34 of the slide 26 as then disposed, a weight 56 representative of the new 1500 ton cargo is placed on the beam 52 so that the weight's centerline 57 is in alignment with hairline 34 of the slide 26. A duplicate weight 56 is then added topside of the original displacement weight already positioned to the right of the keel at the height therefrom of the former center of gravity. At the conclusion of this step, although the weight systems on either side of the fulcrum 50 are equal as to weight, the beam 52 is out of balance to the extent that the respective centers of gravity on each side are different.

(e) Next, the right hand set of weights is moved along the beam 52 toward the centerline 24 until the beam is again balanced. Now, upon moving the slide 26 until its hairline 34 is in alignment with lines 57 of the weights 56, and taking a reading from the graph in accordance with this position of the hairline 34 it is indicated that the new center of gravity (if actual load transfer took place) would be at a point 23.3 feet above the keel. The same answer for this relatively simple problem might also have been arrived at mathematically by solving the equation $(6000 \times 24.95) + (1500 \times 16.7) = (6000 + 1500)X$, in which $X = 23.3$ feet or the height of the new center of gravity above the keel.

(f) Taking on the new cargo would increase the displacement by 1500, hence 6000 plus 1500 equals 7500 tons or the new displacement. Entering the draft-displacement with 7500 tons, it is found that the new draft would be at 15.7 feet about the keel.

(g) Following the new 15.7 draft line horizontally, it will be found that the same intersects the KM curve at a point 25.15 feet above the keel, which height is that of the metacentric point above the keel.

(h) Subtracting the ship's new center of gravity height from that of the new metacentric height will indicate the new GM, hence $25.15 - 23.3 = 1.85$ feet, or the new GM.

The second typical example is one in which the draft amidships in feet is known to be 18.0 and the existing GM is known to be 1.4 ft., it being desired to ascertain how much of the ship's 1,000 ton deck cargo (whose mean elevation is 41 feet above the keel) must be removed to raise the GM by 0.3 feet, i. e., to 1.7 feet. To do this, referring to Fig. 1, the following steps are taken:

(a) The KM curve is observed to intersect the 18.0 feet draft line at a point on the graph 22 corresponding to 24.17 feet above the keel, thus establishing the ship's metacentric point as 24.17 feet.

(b) Subtracting the known GM of 1.4 from the established metacentric height of 24.17 feet, the transverse center of gravity of the ship as then loaded is determined to be 22.77 feet above the keel.

(c) From the draft-displacement scale it is determined that an 18.0 feet draft is equivalent to a displacement of 8700 tons. Accordingly, the hairline 34 of the slide 26 is moved along the right hand side of the graph 22 to a point where the hairline overlies the vertical line at 22.77 feet. Then the weights 56 representative of this 8700 ton displacement are placed on the beam 52 and lined up by the V-notch 68 with the hairline 34 of the slide 26.

(d) Next, the slide 26 is moved to the left hand 41.0 feet mark, a weight representative of the 1000 ton deck cargo being placed on the beam 52 in alignment with the hairline 34 of the slide 26. A weight representative of the balance of the displacement, (i. e., $8700 - 1000 = 7700$) 7700 tons is placed on the beam to the left of the keel and moved until the beam again balances which will be found to have been accomplished when the weight is positioned at 20.40 feet.

(e) As a trial balance the following steps are taken:

(1) A weight representative of 100 tons if off loaded both from the left hand 41 feet mark and from the right hand center of gravity, thus causing the beam to become unbalanced.

(2) The right hand weight is moved until the balance of the beam is restored, which will be found to have been accomplished when the weight is at 22.56 feet. Next, the hairline of the slide 26 is moved into alignment with this new position of the weight.

(3) The auxiliary slide 40 on which is inscribed a curve 44, is then positioned in such a manner that said curve lies 1.7 feet to the left of the KM curve of the graph 22. The curve 44 as then positioned is the loci of points at one of which that vertical line on the graph representative of the center of gravity must intersect with that horizontal line which is representative of the draft-displacement corresponding to such weight system. In the trial balance used here for illustrative purposes it will be found that the 8600 ton displacement line intersects the 22.56 feet vertical line at a point underlying the curve 44 of the auxiliary slide 40 as then positioned 1.7 feet from the KM curve.

(4) The conclusion arrived at is that it would be necessary to remove 100 tons of deck cargo to raise the GM to 1.7 feet. Had the intersection indicated in (3) above occurred either to the right or to the left of the inscribed curve, it would have been necessary to have proceeded with trial balances after the manner indicated until the intersection did occur coincident with the curve 44.

The invention described herein may be manufactured and used by or for the Government of the United States of America for government purposes without the payment of any royalty thereon or therefor.

Having described the invention what is claimed as novel and desired to be protected by Letters Patent of the United States is:

1. A ship loading evaluating device comprising, a table, a knife-edge fixed thereon, a graph on said table having coordinates representing distances in feet from the keel and various displacements in tons in accordance with load changes on a particular ship, a hairline slide mounted on said table and movable over said graph, two frame members attached to the extremities of said table and having mutually directed elongated openings therein, a beam balanced in parallel juxtaposition with said table on said knife-edge, said beam having its extremities penetrating said elongated openings and being freely movable therein under conditions of unbalance, weights representative of present load and of proposed changes in load slidably mountable on said beam, said weights having means for cooperatively registering said weights and said hairline into alignment.

2. A ship loading evaluating device comprising, an elongated graph having indicia thereon representative of displacements in tons and footage distances of load loci from keel, a balance beam co-extensive in length with said graph and fulcrumed at the longitudinal center thereof, two frame members attached to the extremities of said table and having mutually directed elongated openings therein for movably receiving the extremities of said beam, weights representative of loads slidably mountable on the opposite sides of the fulcrum of said beam, and a hairline slide extending beyond said graph and overlapping said beam, said slide being movable along said graph and operable to aid in the proper positioning of the weights on said beam and assist in taking readings from said graph following the final positioning of said weights in an evaluating operation.

3. A ship loading evaluating device comprising, a graph having one set of spaced lines representing distances in feet of different elevations from the keel on opposite sides of a keel line, another set of spaced lines extending in opposite direction to said first set and representing displacement in tons having a KM curve thereon, a hairline slide movable along said graph, an auxiliary slide having a KM curve corresponding to the KM curve of said graph, said auxiliary slide being so mounted on said hairline slide that movement of the former with respect to the latter will at all times result in the KM curve of the slide being parallel to the KM curve of the graph, a framework attached to said table having mutually directed elongated openings, a knife-edge also attached to said table, a balance beam balanced on said knife-edge and extending into the openings in said framework, and weight means associated with said beam cooperating with said graph and said slides.

4. A ship loading evaluating device comprising, a table, a graph affixed to said table having coordinates representing distances of different elevations from the keel on opposite sides of a keel line and displacements in accordance with load changes on a particular ship, and a KM curve for said ship being represented on said graph; a hairline slide movable over said graph and protruding beyond the edge of said graph, an auxiliary slide having a KM curve etched thereon corresponding to the KM curve of said graph; a knife edge secured to said table in correspondence with the keel line of said graph; a balance beam co-extensive in length with said graph, supported upon said table, balanced on said knife edge in parallel juxtaposition with said graph and disposed beneath the protrusion of said hairline slide, and weights representative of loads slidably mountable on said beam on the opposite sides of said knife edge, said weights and said slide and graph cooperating to calculate the stability of the ship under different load conditions.

5. A ship loading evaluating device comprising a table, a graph removably affixed to said table having coordinates representing distances of different elevations from the keel on opposite sides of a keel line and displacements in accordance with load changes on a particular ship, and a KM curve for said ship being represented on said graph; a hairline slide movable over said graph and extending beyond the limits of said graph in one direction, an auxiliary slide having a KM curve etched thereon corresponding to the KM curve of said graph, said auxiliary slide being slidably attached to said hairline slide, a knife-edge attached to said table in correspondence with the keel line on said graph, a pair of frameworks attached to the ends of said table, said frameworks having longitudinally extending slots, a balance beam co-extensive in length with said graph and balanced on said knife-edge in parallel juxtaposition with said graph, the ends of said balance being inserted in said frameworks and guided by said longitudinally extending framework slots, and weights representative of ship loads slidably mountable on said beam on opposite sides of said knife-edge, said weights each having a centrally located peripheral index line marked thereon, said hairline slide extension protruding over said balance beam such that said index lines on said weights may be brought into register with said hairline slide, whereby the location of said weights on said beam as determined by their relation to their supporting table, said graph and said KM curve thereon indicate the stability of said ship under varying load conditions.

CHARLES W. MERRIAM, Jr.
FRANK K. PERKINS.

REFERENCES CITED

The following references are of record in the file of this patent:

UNITED STATES PATENTS

| Number | Name | Date |
|---|---|---|
| 958,192 | Tate | May 17, 1910 |
| 2,023,548 | Ralston | Dec. 10, 1935 |
| 2,391,243 | Hutton | Dec. 18, 1945 |